United States Patent [19]

Kimura

[11] Patent Number: 5,315,459
[45] Date of Patent: May 24, 1994

[54] VIDEO CASSETTE RECORDER DEVICE

[75] Inventor: Takashi Kimura, Yokohama, Japan

[73] Assignee: Canon Kabushiki Kaisha, Tokyo, Japan

[21] Appl. No.: 15,899

[22] Filed: Feb. 10, 1993

Related U.S. Application Data

[63] Continuation of Ser. No. 628,176, Dec. 17, 1990, abandoned.

[30] Foreign Application Priority Data

Dec. 18, 1989 [JP] Japan .................................. 1-326120
Dec. 18, 1989 [JP] Japan .................................. 1-326121

[51] Int. Cl.$^5$ ............................................. G11B 15/665
[52] U.S. Cl. ............................................................ 360/85
[58] Field of Search ................... 360/85, 95, 96.1-96.4

[56] References Cited

U.S. PATENT DOCUMENTS 4,797,758 1/1989 Yamaguchi et al. ................... 360/85
4,975,793 12/1990 Oka ........................................ 360/85
4,991,039 2/1991 Kaku ..................................... 360/85

Primary Examiner—Robert S. Tupper
Attorney, Agent, or Firm—Fitzpatrick, Cella, Harper & Scinto

[57] ABSTRACT

A recording or reproducing device includes a pinch roller for pressing a tape-like recording medium against a capstan, a first member for rotatably supporting the pinch roller, a second member for rotatably pivoting the first member, a positioning member for positioning the second member at a predetermined position, and a moving mechanism for moving the second member and engaging it with the positioning member to position the second member at the predetermined position when the tape-like recording medium is loaded. The second member is positioned by engaging a plurality of portions of a shaft for pivoting the first member with the positioning member when the recording medium is loaded.

17 Claims, 10 Drawing Sheets

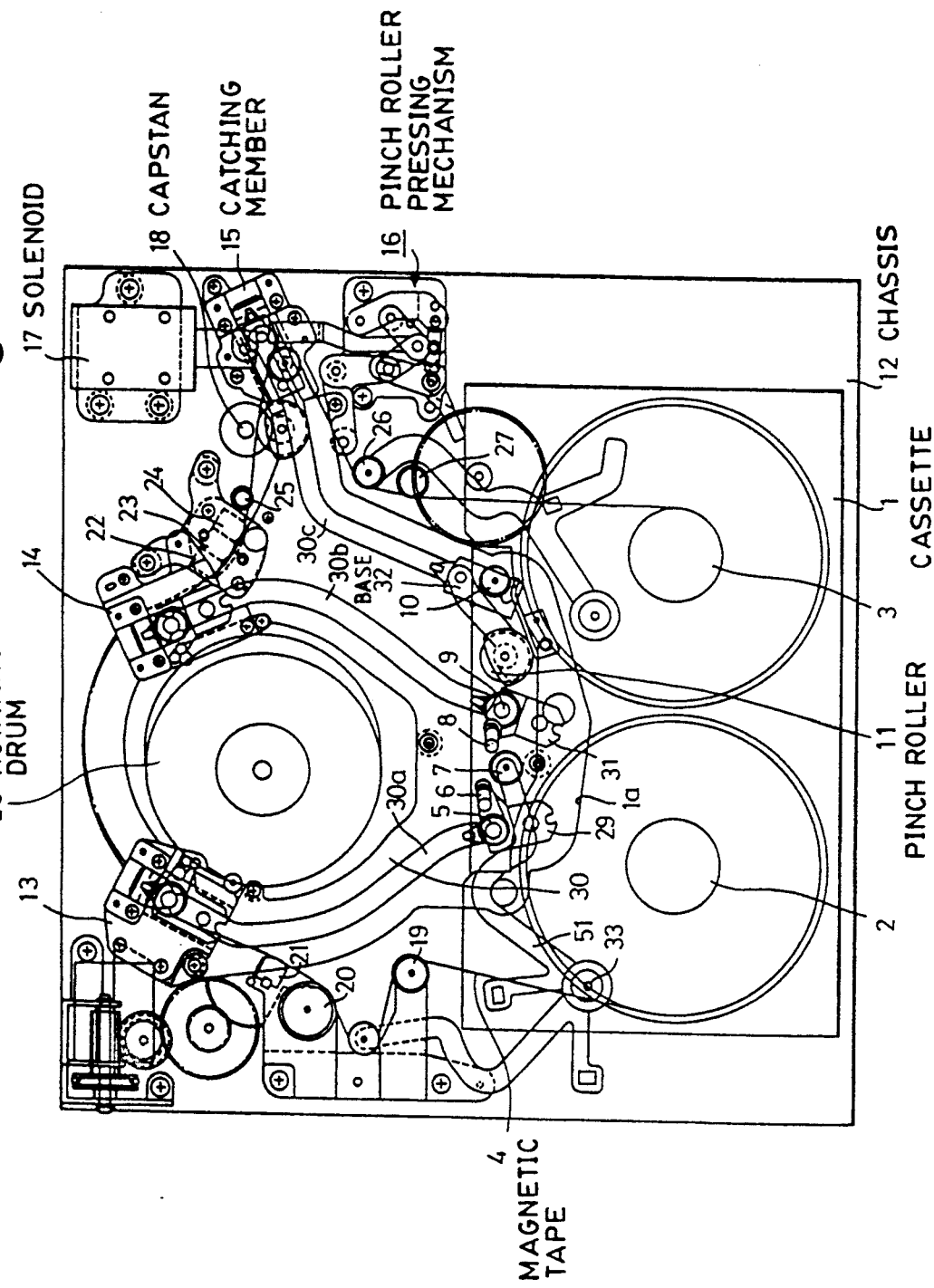

VIDEO CASSETTE RECORDER DEVICE

This application is a continuation of application Ser. No. 07/628,176 filed Dec. 17, 1990, now abandoned.

BACKGROUND OF THE INVENTION

1. Field of the Invention

This invention relates to a tape loading mechanism for a VCR (video cassette recorder), and more particularly, to a tape loading mechanism which draws a tape-like recording medium from a tape cassette loaded in a VCR, and winds the medium around a rotating head drum.

2. Description of the Related Art

In a tape loading mechanism for a VCR, in a loading method wherein, in general, a capstan is situated outside a running path of a magnetic tape, and a pinch roller for pressing the magnetic tape against the capstan is pressed against the capstan from the inside of the running path of the magnetic tape, it is necessary to move the pinch roller from an opening of a magnetic-tape cassette to a predetermined position and to accurately position it in accordance with a loading operation.

The following two kinds of structures have mostly been adopted for moving and positioning a pinch roller in a conventional tape loading mechanism of this kind:

(a) A structure wherein an arm rotatably supporting a pinch roller is rotatably pivoted on a movable base, and the pinch roller is positioned by moving the base and butting the arm against a stopper at a loading position.

(b) A structure wherein a supporting member pivoting a supporting arm of a pinch roller is moved by a moving mechanism, the supporting member is positioned by a pin secured on the supporting member being engaged with a catching member having a V-groove, and is charged by a spring.

Such structures, however, have the following disadvantages: It is difficult to provide a precise tilt angle of the pinch roller, that is, to secure so-called inclination accuracy at a catching position. Furthermore, inclination changes due to a reaction force when the pinch roller is pressed, and stable running of a magnetic tape is thereby hindered.

The structure of a pinch roller pressing mechanism generally adopted in a conventional VCR is shown in FIG. 1. In FIG. 1, there is shown a magnetic tape 4. A capstan 18 runs the magnetic tape 4 at a constant speed. A pinch roller 11 presses the magnetic tape 4 against the capstan 18. The pinch roller 11 is rotatably pivoted at an end portion of a rotatably-pivoted arm 98. In this structure, the arm 98 is pulled in the direction of arrow J by another member (not shown), a pressing force is given to the pinch roller 11 by a charging spring (not shown), and the pinch roller 11 is thereby pressed against the capstan 18.

In this structure, however, unevenness in the pressing force is produced along the vertical direction (the direction of the axis) of the pinch roller 11, hindering in some cases stable running of the magnetic tape 4. Accordingly, a structure as shown in FIGS. 2(A) and 2(B) has recently been adopted.

In FIGS. 2(A) and 2(B), a pressing lever 99 for providing a pressing force to a pinch roller 11 includes two contact members 99a and 99b, each having the shape of a projected piece, formed facing each other, and is lever 99 provided so as to be rotatable around a shaft 99c. The pinch roller 11 is supported by a rotable arm 98'. In this structure, by pulling the pressing lever 99 in the direction of arrow K in FIG. 2(A), the contact members 99a and 99b press upper and lower end portions 11a and 11b of the shaft of the pinch roller 11, respectively, to give a uniform pressing force to the pinch roller 11.

In the structure shown in FIGS. 2(A) and 2(B), however, if the contact members 99a and 99b of the pressing lever 99 are not aligned with each other, unevenness in the pressing force is produced along the direction of the shaft of the pinch roller 11. Accordingly, it is necessary to align the contact members 99a and 99b with each other in an assembling process of the VCR. Hence, this structure has the problems that it takes much time for the alignment, and production cost is thereby increased.

SUMMARY OF THE INVENTION

The present invention has been made for solving the above-described problems.

It is an object of the present invention to provide a highly accurate and stable tape loading mechanism.

It is a further object of the present invention to provide a tape loading mechanism wherein inclination of a pinch roller relative to a capstan while being pressed against the capstan is very accurately defined, and the inclination is not influenced by a reaction force during the pressing operation.

These objects are accomplished, according to one aspect of the present invention, by a drive control mechanism for a rotating member comprising a rotation driving member serving as a driving source, a rotating member for being rotated by engaging with the rotation driving member, a first member for rotatably supporting the rotating member, a second member movably connected to the first member via a supporting member, a positioning member for positioning the second member at a predetermined position where the rotation driving member can engage with the rotating member, and a moving mechanism for moving the second member to the predetermined position, wherein, when positioning the second member, the positioning member engages with a plurality of portions of the supporting member for connecting the first member and the second member to position the supporting member.

According to another aspect, the present invention relates to a tape loading mechanism for a video cassette recorder comprising a pinch roller for pressing a tape-like recording medium against a capstan, a first member for rotatably supporting the pinch roller, a second member for rotatably pivoting the first member, a positioning member for positioning the second member at a predetermined position, and a moving mechanism for moving the second member and engaging it with the positioning member to position the second member at the predetermined position when the tape-like recording medium is loaded, wherein the second member is positioned by engaging a plurality of portions of a supporting shaft for pivoting the first member with the positioning member when the recording medium is loaded.

It is a still further object of the present invention to provide a tape loading mechanism wherein, when a second member is positioned while a tape is loaded, the second member is very accurately positioned at a predetermined position by engaging two end portions of a shaft for pivoting a first member with a positioning member, the second member's angle is very accurately positioned, and inclination or tilt of the first member can be very accurately positioned.

It is still another object of the present invention to provide a mechanism comprising a pinch roller for pressing a magnetic tape against a capstan, an arm member for rotatably supporting the pinch roller, a base member for rotatably pivoting the arm member, a positioning member for positioning the base member at a predetermined position, and a moving mechanism for moving the base member and engaging it with the positioning member to position the base member at the predetermined position when the magnetic tape is loaded. The mechanism is configured so that the base member is positioned by engaging two end portions of a shaft for pivoting the arm member with the positioning member during the loading operation. Thus, when positioning the base member during the loading operation, the shaft for pivoting the arm member can be very accurately positioned, the arm member's angle can be very accurately defined, and inclination of the pinch roller can be very accurately defined. Hence, it is possible to secure stable running of the magnetic tape.

It is still a further object of the present invention to provide a pinch roller pressing mechanism for a magnetic recording and reproducing apparatus wherein a pressing force along the direction of the shaft of a pinch roller can be uniform without adjustment.

It is still another object of the present invention to provide a tape driving mechanism which can very accurately and stably perform tape running utilizing pressure contact between a capstan and a pinch roller.

These objects are accomplished, according to one aspect of the present invention, by a pinch roller pressing mechanism for pressing a pinch roller against a capstan by pressing two end portions of the pinch roller with respective two arms rotatably pivoted facing each other and parallel to each other by rotating the arms, wherein the two arms are rotatably pivoted around their central portions, and respective one ends of the arms facing each other are connected by a connecting shaft. The two arms rotate by applying a force on a central portion of the connecting shaft between the arms, and respective end portions of the arms opposite to the connecting shaft press two end portions of the pinch roller.

It is still another object of the present invention to provide a pinch roller pressing mechanism wherein, when pressing forces by two arms are different from each other according to the positions of the two arms when pressing a pinch roller, the arms slightly rotate in directions reverse to each other due to a difference between their reaction forces, and a balance is provided so that the reaction forces are equal. That is, a balance is provided so that the pressing forces of the arms are equal. Accordingly, two end portions of the pinch roller can be pressed with uniform pressing forces, and hence pressing forces along the direction of the shaft of the pinch roller can be uniform.

It is still another object of the present invention to provide a pinch roller pressing mechanism for pressing a pinch roller against a capstan by pressing two end portions of the pinch roller with respective two arms rotatably pivoted facing each other and parallel to each other by rotating the arms, wherein the two arms are pivoted so as to be rotatable separately around their central portions, and respective one ends of the arms facing each other are connected by a connecting shaft. The two arms rotate by applying a force on a central portion of the connecting shaft between the arms, and respective end portions of the arms opposite to the connecting shaft press two end portions of the pinch roller. Thus, the present invention provides a tape loading mechanism for a video cassette recorder or the like which has the excellent effects that pressing forces pressing the two end portions of the pinch roller are automatically balanced, the pressing force of the pinch roller can be uniform along the direction of its shaft without adjustment, and it is possible to secure stable running of a magnetic tape.

These and other objects and features of the present invention will become more apparent from the following description taken in connection with the accompanying drawings.

BRIEF DESCRIPTION OF THE DRAWINGS

FIG. 3 is a perspective plan view showing the main configuration of an entire tape loading mechanism including a pinch roller pressing mechanism of a VCR according to an embodiment of the present invention;

DETAILED DESCRIPTION OF THE PREFERRED EMBODIMENT

Figure 1:
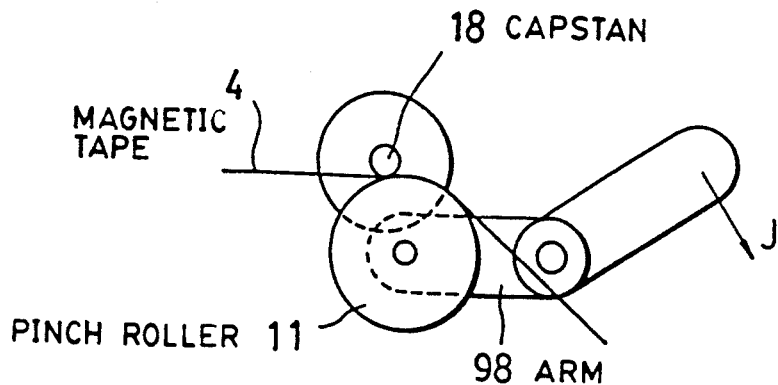
FIG. 1 is a plan view showing the configuration of a principal part of a conventional pinch roller pressing mechanism.

An embodiment of a tape loading mechanism including a pinch roller pressing mechanism of a VCR to which the present invention is applied will now be explained with reference to the attached drawings. The loading method for the tape loading mechanism of the present embodiment is a parallel M loading method wherein all loading posts move parallel to a chassis, and a magnetic tape is wound nearly symmetrically to the right and left of a rotating drum.

First, the main configuration of the entire tape loading mechanism will be explained with reference to FIG. 3. In FIG. 3, a magnetic tape cassette 1 (abbreviated hereinafter a "cassette") receives a magnetic tape 4 by winding it around a supply reel 2 and a takeup reel 3.

An opening 1a is provided in the cassette 1 so that, when the cassette 1 is mounted on a chassis (chassis of the mechanism) 12 of the VCR by a cassette mounting mechanism (not shown), posts 5-10 for drawing the magnetic tape 4 from the cassette 1 and a pinch roller 11 enter within the opening 1a. The posts 5, 6 and 8, 9 are secured on movable bases 29 and 31, respectively. The post 7, serving as a tension regulating post at the supply side, is provided on a distal end portion of an arm 51 rotatable around a shaft 33. The post 10 is secured on a movable base 32, which supports the pinch roller 11.

A rotating drum 28, which rotates while supporting a magnetic head (video head, not shown), is provided on the chassis 12 inclined at a predetermined angle. Upstream from the rotating drum 28 along a running path of the magnetic tape 4, that is, so-called tape path, are successively disposed a post 19, an impedance roller 20 and an entire-width erasing head 21.

Near both sides of the rotating drum 28 are disposed a catching member 13 for positioning the posts 5 and 6 immediately before the rotating drum 28 along the tape path, and a catching member 14 for positioning the posts 8 and 9 immediately after the rotating drum 4.

Further downstream from the catching member 14 along the tape path are successively disposed an erasing head 22 for audio, CTL and time record signals, a recording and reproducing head 23 for audio, CTL and time record signals, a motor head 24 for said signals recorded on the tape, a post 25, and a capstan 18 for running the magnetic tape 4 at a constant speed.

Near the capstan 18 is disposed a catching member 15 for positioning the post 10 and the pinch roller 11. Near the catching member 15 is provided a pinch roller pressing mechanism 16 for pressing the pinch roller 11 against the capstan 18 by driving a solenoid 17, as will be described later.

Near the pinch roller pressing mechanism 16 are provided a tension regulating post 26 at the winding side and a post 27 along the tape path.

In addition to the above-described configuration, on the chassis 12 is provided a rail 30 having grooves 30a-30c for guiding moving paths of the bases 29, 31 and 32, respectively.

An outline of a tape loading operation according to the above-described configuration will now be explained.

First, when the cassette 1 has been mounted and the mounting operation has been detected by a detection switch (not shown), the bases 29, 31 and 32 move toward the inner side of the apparatus along the grooves 30a-30c of the rail 30 driven by a driving system (to be described later), respectively. At the same time, the posts 5, 6 and 8, 9 and 10, and the pinch roller 11 move toward the inner side. By the rotation of the arm 51 in a counterclockwise direction, the tension regulating post 7 moves toward the inner side, and the magnetic tape 4 is drawn from the cassette 1 by the posts 5-10.

The bases 29, 31 and 32 contact and engage with the catching members 13, 14 and 15, respectively. The posts 5, 6, 8-10 and the pinch roller 11 are thereby positioned at predetermined positions, and the post 7 is also positioned at a predetermined position. Thus, the tape loading operation is completed. At this time, the magnetic tape 4 is helically wound around the rotating drum 28 at an angle of 180+α°, and is opened to the right and left by the tension regulating post 7 and the post 10. The magnetic tape 4 thereby contacts a fixed head and the other posts, and the tape path is formed.

When a reproducing button or a recording button (not shown) is depressed in this state, the pinch roller 11 is pressed against the capstan 18 interposing the magnetic tape 4 therebetween due to the drive of a pressing mechanism (to be described later), tape running is started, and a reproducing or recording operation is performed by the rotating magnetic head.

Unloading of the magnetic tape 4 is performed in accordance with the operation of an ejection button (not shown). In an unloading operation which is reverse to a loading operation, the respective posts 5-10 move toward the opening 1a of the cassette 1, and the magnetic tape 4 is wound within the cassette 1. After the unloading operation has ended, the cassette 1 is ejected.

Figure 4:
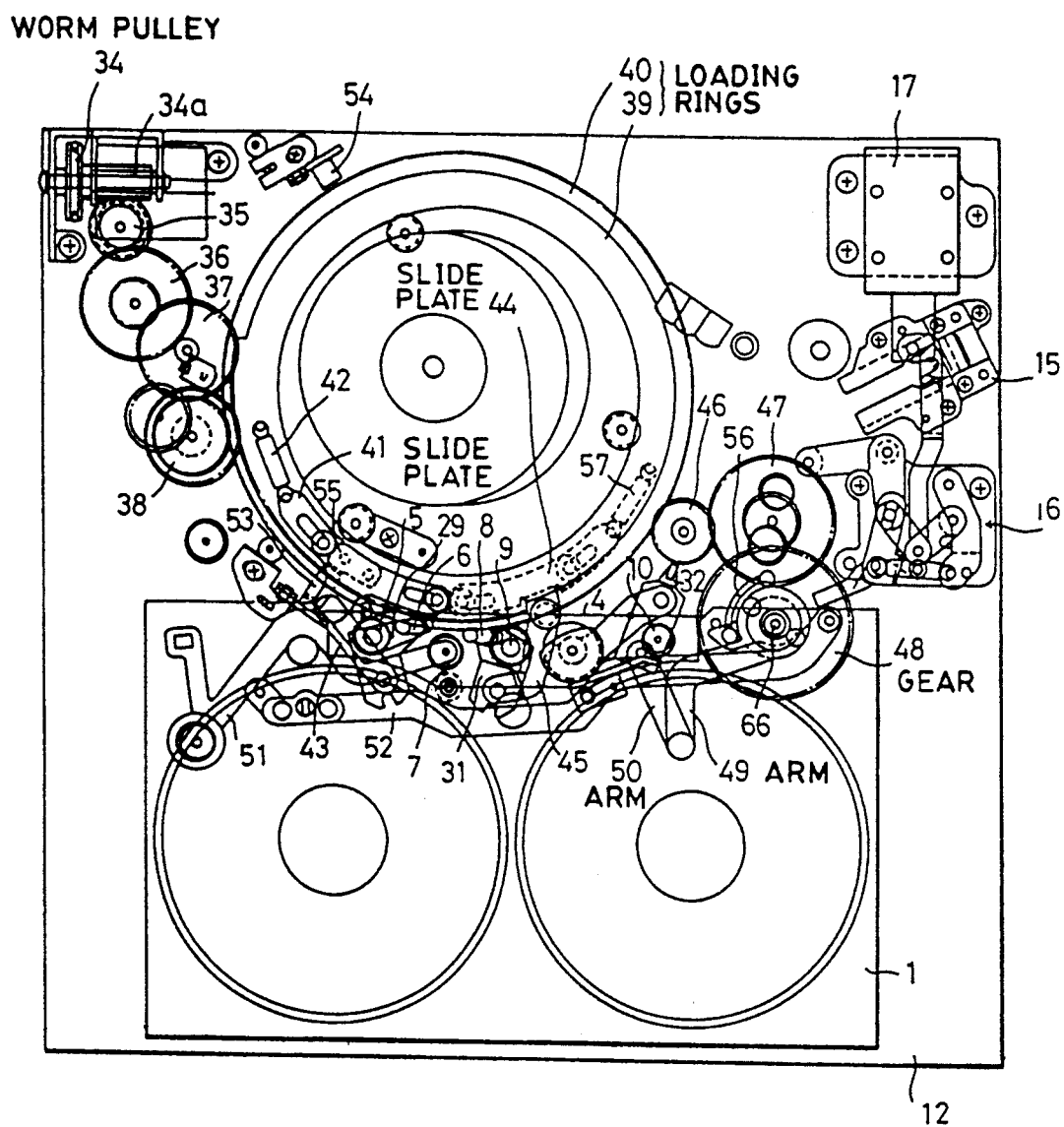
FIGS. 4 and 5 are perspective plan views showing the configuration and operation of a driving system of the tape loading mechanism.

Next, the configuration and operation of a driving system for the loading mechanism will be explained with reference to FIGS. 4 and 5. FIG. 4 shows an unloaded state, and FIG. 5 shows a state wherein loading has been completed.

Figure 5:
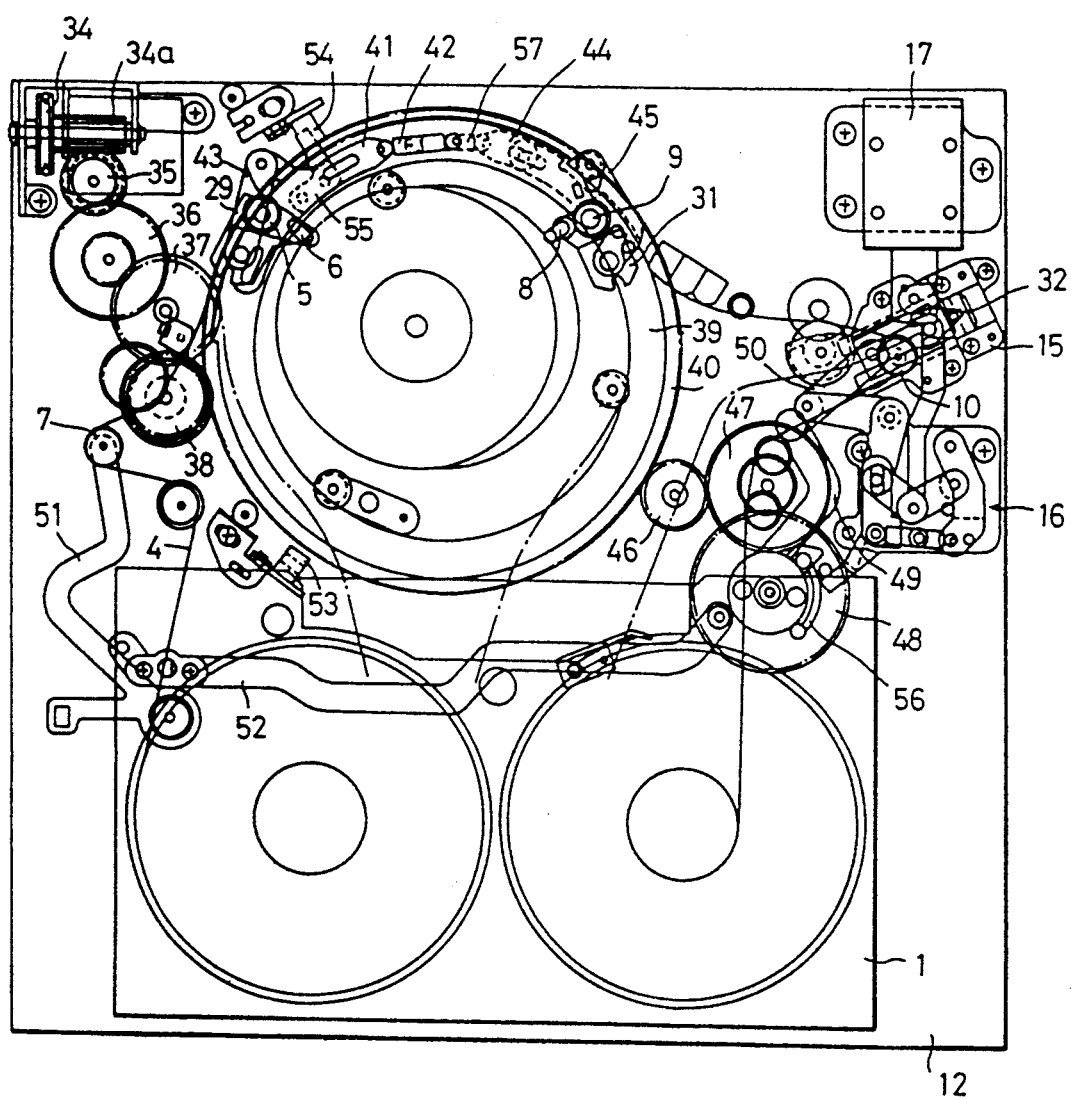

In FIGS. 4 and 5, a worm pulley 34 is rotated by the drive of a loading motor (not shown) via a belt. The rotation driving force of the worm pulley 34 is transmitted to loading rings 39 and 40 via a worm member 34a of the worm pulley 34 and gears 35-38. The two rings 39 and 40 rotate in directions reverse to each other.

On the loading ring 39 is slidably mounted a slide plate 41, which is pulled in a clockwise direction by a spring 42. On the slide plate 41 is rotatably mounted an arm 43, to a distal end portion of which is rotatably connected the base 29.

On the loading ring 40 is slidably mounted a slide plate 44, which is pulled in a counterclockwise direction by a spring 57. On the slide plate 44 is rotatably mounted an arm 45, to a distal end portion of which is rotatably connected the base 31.

The rotation force of the loading ring 40 is transmitted to a gear 48 via gears 46 and 47. On a shaft 66 of the gear 48 is rotatably pivoted an arm 49, to the distal end of which is connected an arm 50. The base 32 is rotatably connected to the distal end of the arm 50.

To the gear 48 is rotatably connected a rod 52, the other end of which is rotatably connected to a tension regulating arm 51. Photointerrupters 53 and 54 detect an unloading position and a loading position, respectively. An obturating member 55 fixed on the loading ring 39 enters in groove portions of the photointerrupters 53 and 54 to interrupt light, and thus the detection is performed.

Next, the operation of the above-described configuration will be explained.

First, when the mounting operation of the cassette 1 has been detected in the state shown in FIG. 4, a loading motor (not shown) is driven to rotate the worm pulley 34, and the loading rings 39 and 40 rotate in the clockwise and counterclockwise directions via the gears 35-38, respectively. The bases 29 and 31 are thereby pulled by the arms 43 and 45 to move toward the inner side along the grooves of the rail 30.

The gear 48 and the arm 49 rotate in clockwise directions via the gears 46 and 47 to press the arm 50. The base 32 thereby moves toward the inner side. At the same time, the rod 52 moves in a left direction, and the tension regulating arm 51 rotates in a counterclockwise direction linked therewith.

After the posts 5-10 have thus moved while drawing the magnetic tape 4 from the cassette 1 and have reached the loading position, the loading motor further rotates, and stops when the obturating member 55 has reached the position of the photointerrupter 54. Thus, the loading operation has ended as shown in FIG. 5. After the bases 29, 31 and 32 have contacted and engaged with the catching members 13-15, respectively, the loading rings 39 and 40 further rotate. The springs 42, 57 and 56 are thereby stretched. The bases 29, 31 and 32 are pressed against the catching members 13-15 by elastic forces of the springs to be positioned, respectively.

During the above-described loading operation, the pinch roller 11 moves up to near the capstan 18 due to the movement of the base 32. When the loading operation has ended, the pinch roller 11 is kept positioned at a predetermined position slightly separated from the capstan 18, as will be described later. Subsequently, the pinch roller 11 is pressed against the capstan 18 by the drive of the pinch roller pressing mechanism 16 during a recording or reproducing operation.

Figure 6:
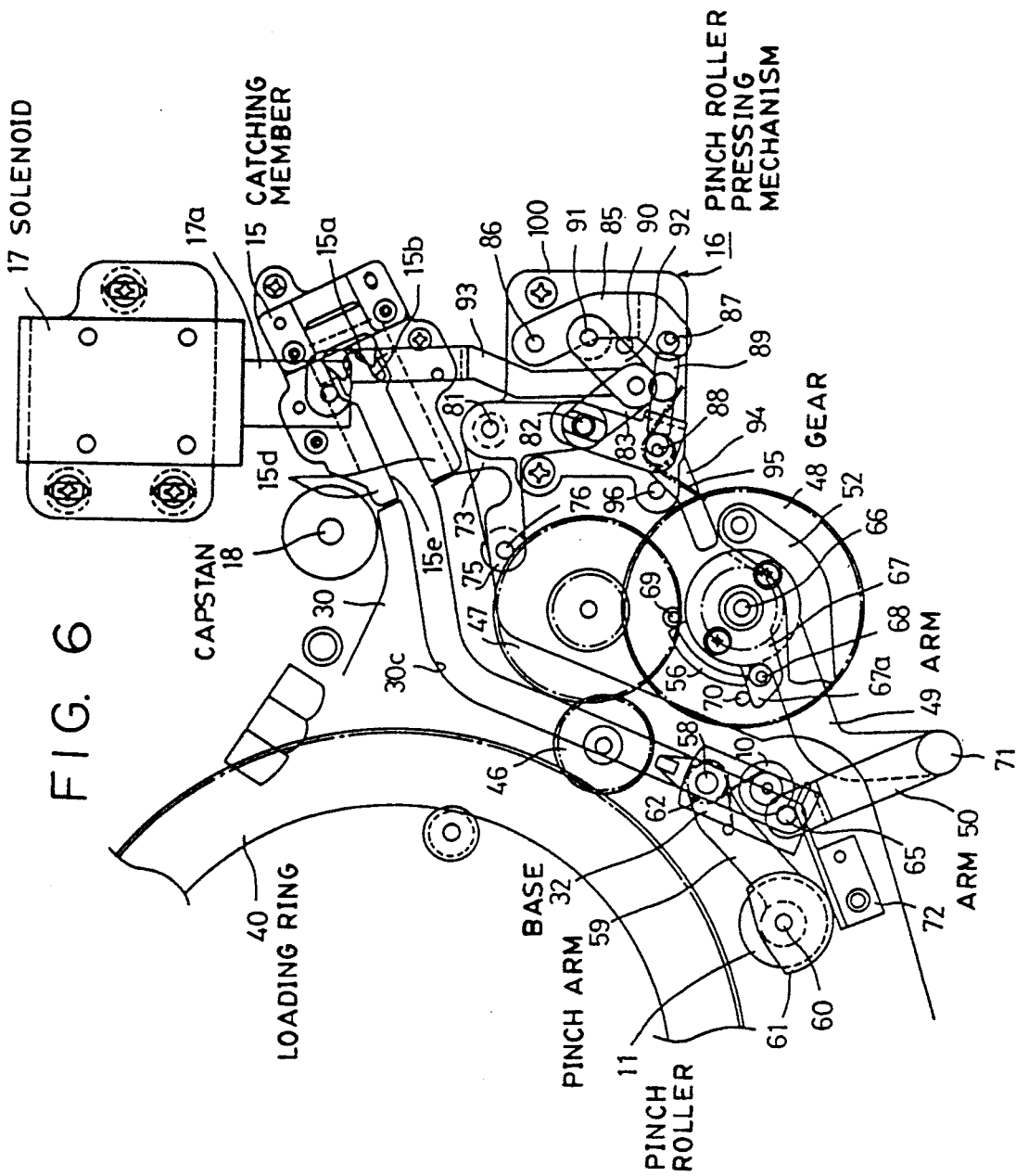
FIGS. 6-8 are perspective plan views showing the configuration and operation of pinch roller moving and pressing mechanisms of the tape loading mechanism.
Figure 7:
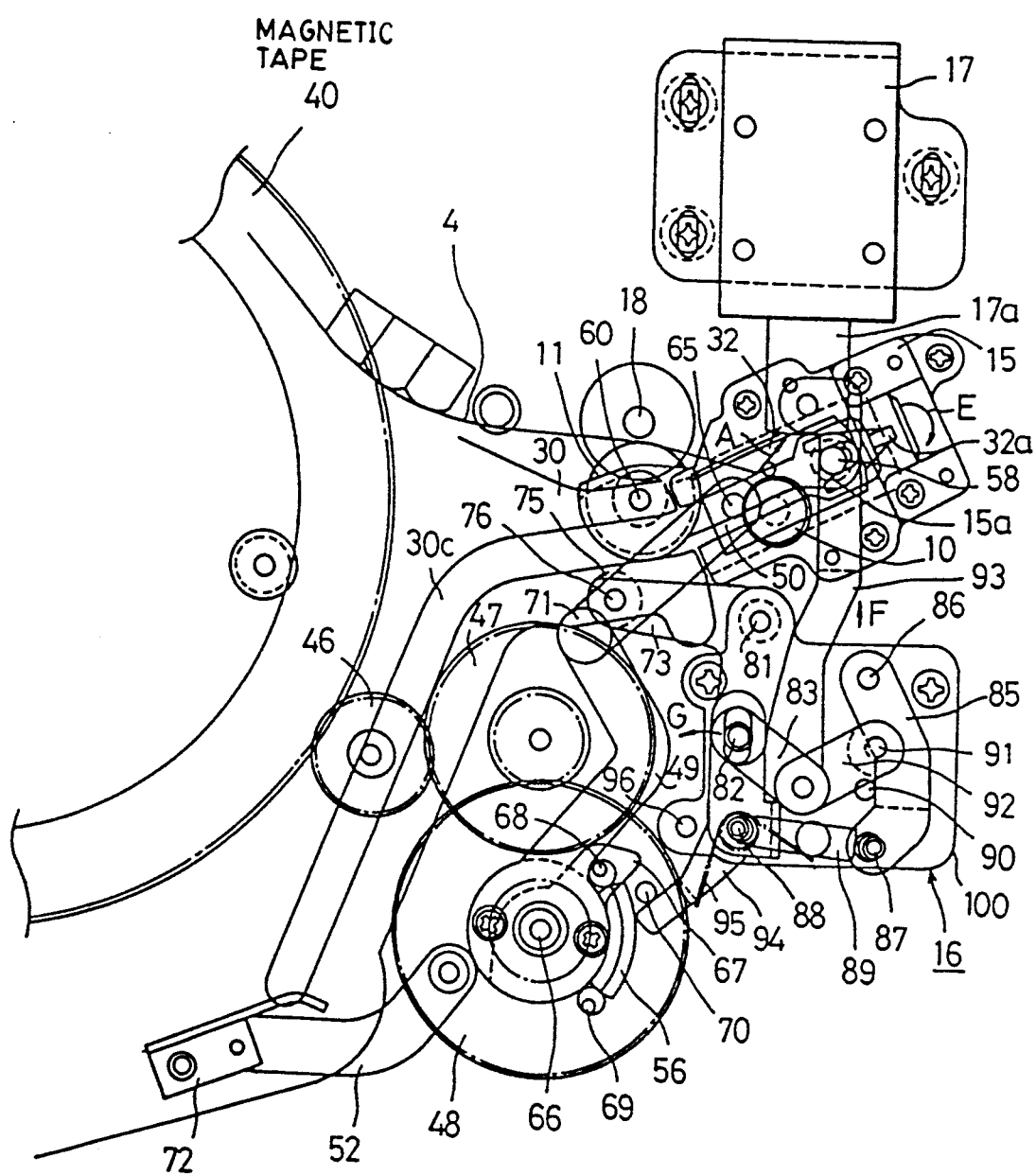
Figure 8:
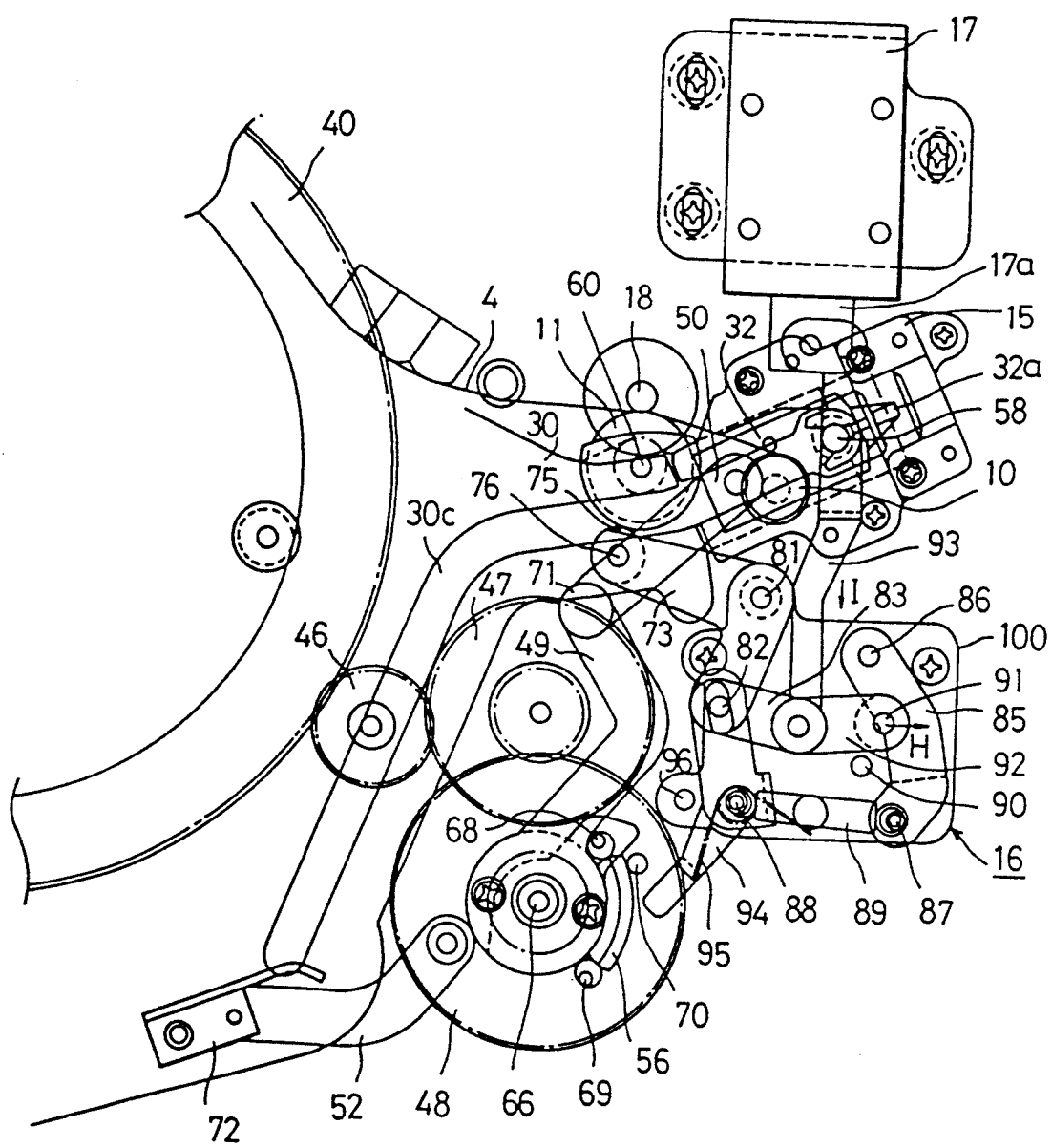
Figure 9:
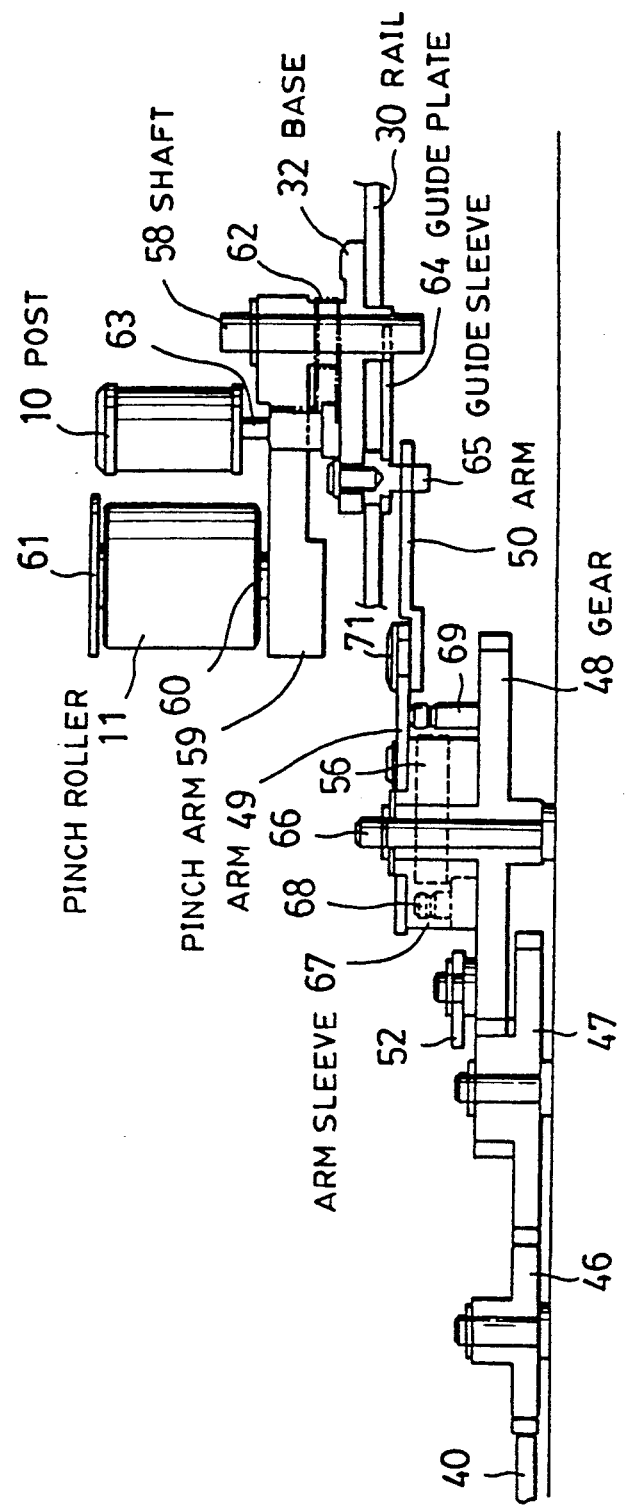
FIG. 9 is a side view showing the configuration of the pinch roller moving mechanism.
Figure 10:
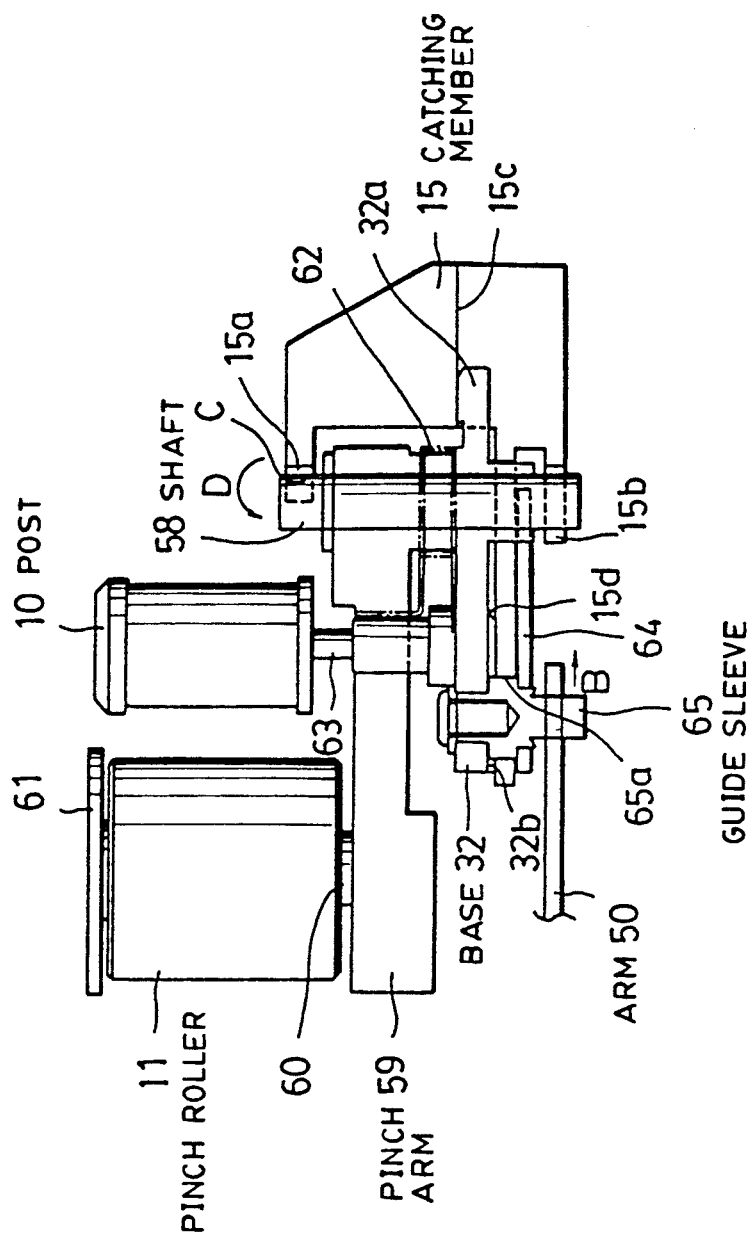
FIG. 10 is a side view showing a secured state of a base of a pinch roller.
Figure 11:
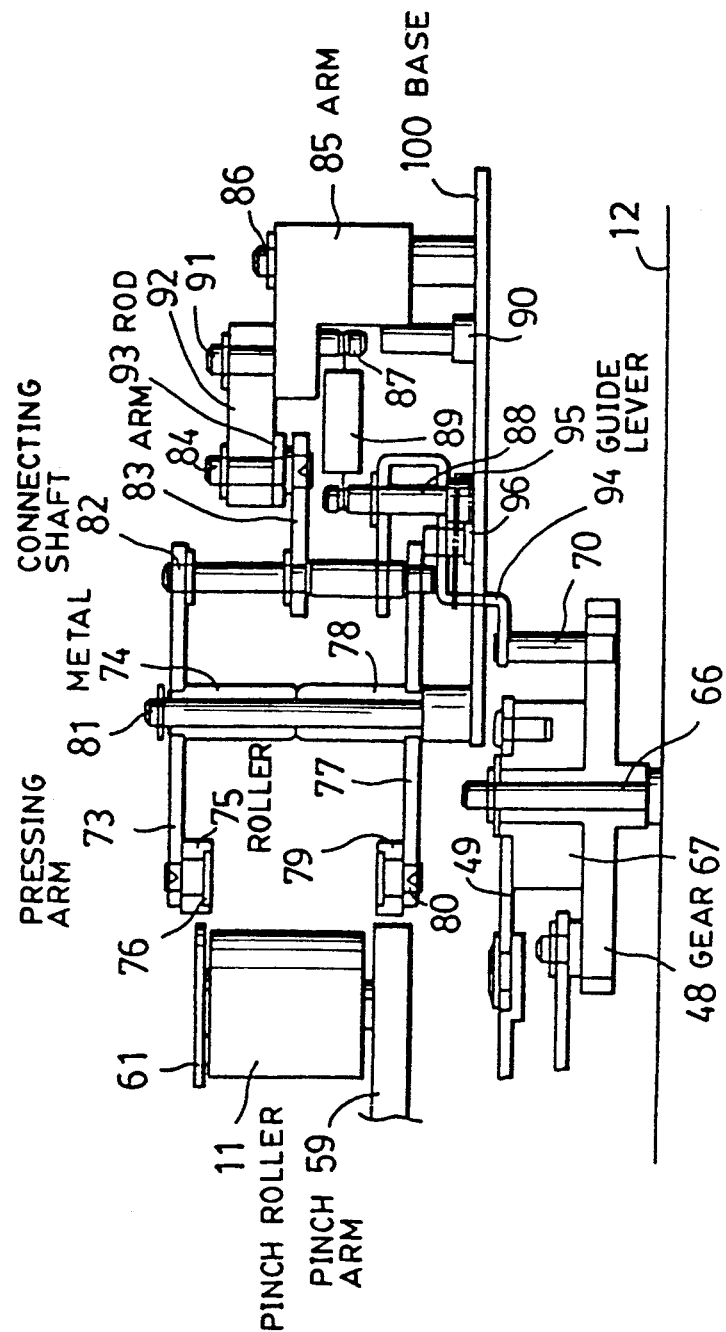
FIG. 11 is a side view showing the configuration of the pinch roller pressing mechanism.

Next, the details of mechanisms relating to the movement and pressing function of the pinch roller will be explained with reference to FIGS. 6–11. FIGS. 6–8 are perspective plan views showing the details of a pinch roller moving mechanism and the pinch roller pressing mechanism: FIG. 6 shows an unloaded state; FIG. 7 shows a state wherein loading has ended; and FIG. 8 shows a pinch roller pressing state. FIG. 9 is a side view of the pinch roller moving mechanism. FIG. 10 is a side view when the base 32 of the pinch roller is catched. FIG. 11 is a side view of the pinch roller pressing mechanism.

First, the detail of the pinch roller moving mechanism will be explained. As shown in FIG. 9, a shaft 58 is secured on the base 32 supporting the pinch roller 11, and a pinch arm 59 is rotatably pivoted by the shaft 58. A pinch shaft 60 is secured on a distal end portion of the pinch arm 59. The pinch roller 11 is rotatably pivoted by the shaft 60, and is prohibited from being drawn out by a cap 61.

The pinch arm 59 is driven in a counterclockwise direction in FIG. 6 by a torsion spring 62. The limit of the rotation in the counterclockwise direction is regulated by a shaft 63 of the post 10 secured on the base 32.

In FIG. 9, a guide sleeve 65 is calked on a part of a guide plate 64. The lower end portion of the shaft 58 on the base 32 is inserted in the groove 30c (see FIG. 6) of the rail 30, the guide sleeve 65 is inserted in the groove 30c while the rail 30 is sandwiched between the base 32 and the guide plate 64, and the guide sleeve 65 is fixed on the base 32 with a screw. Thus, the base 32 is slidably mounted on the rail 30.

An arm sleeve 67 is rotatably fitted around a shaft 66 of the gear 48. The arm sleeve 67 is driven in a clockwise direction in FIG. 6 by the spring 56 stretched between a pin 68 squeezed in the arm sleeve 67 and a pin squeezed in the gear 48. A projection 67a of the arm sleeve 67 contacts a pin 70 squeezed in the gear 48 to regulate the limit of the rotation of the arm sleeve 67.

The arm 49 is fixed on the upper surface of the arm sleeve 67, and the arm 50 is rotatably connected to the distal end of the arm 49 by a dowel 71. The distal end of the arm 50 is rotatably connected to the guide sleeve 65 beneath the rail 30.

As the positioning member relating to the pinch roller moving mechanism, a positioning member 72 for positioning the pinch roller 11 at a predetermined position during an unloading operation is fixed near the front end of the groove 30c of the rail 30, as shown in FIG. 6.

As described above, the catching member 15 for positioning the base 32 is disposed so as to face the rear end of the groove 30c, as shown in FIG. 6. The catching member 15 has a horizontally-protruded tongue-like flat portion 15d in which a groove 15e communicating with the groove 30c is formed. As shown in FIG. 10, a V-groove 15a and a U-groove 15b facing each other are provided at upper and lower portions at the left side of the catching member 15. A flat portion 15c is formed at an upper side of a portion deeper than the groove 15e.

Next, the pinch roller pressing mechanism 16 will be explained in detail.

In FIGS. 6 and 11, a base 100 of the pinch roller pressing mechanism 16 is fixed on the chassis 12. A shaft 81 is secured on the base 100, and hollow metal shafts 74 and 78 are rotatably fitted around the shaft 81. At an upper end portion of the metal shaft 74 and a lower end portion of the metal shaft 78 are calked two identical L-like pressing arms 73 and 77 parallel to each other and facing each other, respectively. The pressing arms 73 and 77 are rotatably pivoted separately around the shaft 81 via the metal shafts 74 and 78, respectively. At distal end portions of the pressing arms 73 and 77 are rotatably mounted rollers 75 and 79 facing each other by dowels 76 and 80, respectively.

The other end portions of the arms 73 and 77 are connected by a connecting shaft 82, and an arm 83 is rotatably connected to a central portion of the connecting shaft 82 between the arms 73 and 77. The other end of the arm 83 is rotatably connected to an arm 92 by a shaft 84. To the shaft 84 is connected a rod 93, the other end of which is connected to a movable core 17a of the solenoid 17.

The other end of the arm 92 is rotatably connected to an arm 85, which is rotatably pivoted by a shaft 86 secured on the base 100, by a shaft 91. A spring holder 87 is provided on the arm 85, which is driven in a clockwise direction in FIG. 6 by a pressing spring 89 stretched between the spring holder 87 and a shaft 88 secured on the base 100. The limit of the rotation of the arm 85 in a clockwise direction is regulated by a stopper 90.

A guide lever 94 rotatably pivoted around the shaft 88 is driven in a clockwise direction in FIG. 6 by a torsion spring 95. The limit of the rotation of the guide lever 94 is regulated by a stopper 96. One end of the guide lever 94 is movably connected to the shaft 82 via a long hole.

Next, an explanation will be provided of the moving, catching and pressing operations of the pinch roller 11 in the above-described configuration.

In the unloaded state shown in FIG. 6, the pinch arm 59 driven in a counterclockwise direction by the spring 62 contacts the positioning member 72. The pinch roller 11 is thereby held at a position so as not to contact the inner wall of the cassette opening and the magnetic tape when the cassette is loaded.

When the cassette is loaded from this state, the loading ring 40 starts to rotate in the counterclockwise direction, and the gear 48 thereby rotates in the clockwise direction via the gears 46 and 47. The arm sleeve 67 and the arm 49 fixed thereto then rotate in a clockwise direction as one body by being pulled by the spring 56. As a result, the base 32 starts to move toward the inner side of the apparatus along the groove 30c of the rail 30 by being pushed by the arm 50. At this time, the pressing arms 73 and 77 are held at positions where the movement of the base 32 is not hindered.

The movement of the base 32 ceases when the base 32 has moved up to the position shown in FIG. 7 and upper and lower ends of the shaft 58 on the base 32 have contacted and engaged with the V-groove 15a and the U-groove 15b of the catching member 15, respectively. However, the rotation of the loading ring 40 further continues, and the gear 48 also continues to rotate. Since the arm sleeve 67 cannot rotate when the base 32 has stopped, the contact of the arm sleeve 67 with the pin 70 is released, and a pulling force by the spring 56 is applied to the guide sleeve 65 via the arms 49 and 50.

The direction of the force is in the direction of arrow A in FIG. 7.

At this time, the base 32 is secured by the catching member 15, as shown in FIG. 10. That is, the base 32 advances along the groove 30c of the rail 30, and is positioned by being seized by the catching member 15. The upper end of the shaft 58 contacts and engages with the V-groove 15a of the catching member 15, and the lower end contacts and engages with the U-groove 15b. At this time, a force in the direction of arrow B is applied to the base 32 from the arm 50. Hence, the base 32 receives a moment in the direction of arrow D around a point C of contact with the V-groove 15a. As a result, the upper surface of the front end 32a of the base 32 contacts the flat portion 15c of the catching member 15, and the lower surface 32b of the base 32 contacts the flat portion 15d. The base 32 is thereby positioned at a predetermined position in the vertical direction. That is, together with the base 32, the shaft 58, the pinch arm 59 and the pinch roller 11 are positioned at predetermined positions in the vertical direction. Since the shaft 58 engages with the grooves 15a and 15b by being pressed, it is positioned at a predetermined position also in the horizontal direction.

In FIG. 7, a moment in the direction of arrow E is exerted on the base 32 around the shaft 58 due to a force in the direction of arrow A, and a portion 65a of the guide sleeve 65 engaging with the rail 30 contacts the left-side edge of the groove 15e (see FIG. 6). The base 32 is thereby positioned at a predetermined position in the horizontal direction. Thus, the base 32 is highly accurately positioned at predetermined positions both in the vertical and horizontal directions, and the pinch roller 11 is highly accurately positioned at a predetermined position slightly separated from the capstan 18.

On the other hand, due to the rotation of the gear 48 in the clockwise direction, the pin 70 contacts the guide lever 94, as shown in FIG. 7. The guide lever 94 thereby rotates in a counterclockwise direction against the drive by the spring 95. The pressing arms 73 and 77 rotate in a clockwise direction linked with the rotation of the guide lever 94, and are held at positions leaving small gaps with the pinch arm 59. At this time, the arm 83 is rotated in a counterclockwise direction linked with the rotation of the guide lever 94, and the rod 93 moves in the direction of arrow F in FIG. 7. Thus, the pinch roller pressing mechanism 16 assumes a state wherein a pressing operation of the pinch roller 11 is awaited.

When a recording or reproducing button has been depressed in this state, current is supplied to the solenoid 17, and the rod 93 is pulled further from the position shown in FIG. 7 toward the direction of arrow F. The arm 92 rotates around the shaft 91 in a clockwise direction linked with the movement of the rod 93, and the connecting shaft 82 is pressed toward the direction of arrow G by the arm 83. The pressing arms 73 and 77 rotate in a clockwise direction due to this pressing force, and the rollers 75 and 79 contact the cap 61 and the pinch arm 59, respectively.

Due to the rotation of the pressing arms 73 and 77, the rollers 75 and 79 press the cap 61 and the pinch arm 59 corresponding to upper and lower end portions of the pinch roller 11, respectively. The pinch arm 59 thereby rotates around the shaft 58 in a clockwise direction, and the pinch roller 11 contacts the capstan 18 via the magnetic tape 4, as shown in FIG. 8. At this time, the pressing arms 73 and 77 cannot rotate, and the connecting shaft 82 is fixed. The arm 83 then rotates around the connecting shaft 82 in a counterclockwise direction. Linked with the rotation of the arm 83, the arm 92 presses the shaft 91 in the direction of arrow H, and the arm 85 rotates in a counterclockwise direction. As a result, the arm 85 leaves the stopper 90, and the elastic force of the spring 89 is transmitted to the pinch roller 11 via the arms 85, 92 and 83, the connecting shaft 82, and the pressing arms 73 and 77. The pinch roller 11 is pressed against the capstan 18 by the elastic force, and running of the magnetic tape 4 is started.

At this time, a reaction force during the pressing operation is applied from the center of the pinch roller 11 toward the center of the shaft 58. However, since this force operates in a direction to press the base 32 onto the catching member 15, it does not adversely influence positioning accuracy, but operates so as to stabilize a positioning operation.

Since the pressing arms 73 and 77 are provided as separate members, and force is applied on a central portion of the connecting shaft 82, the pressing force of the pinch roller 11 transmitted via the rollers 75 and 79 is uniformly applied in the vertical direction of the pinch roller 11.

Next, the pressure releasing operation of the pinch roller 11 will be explained.

If a stop or high-speed-running-mode button is depressed from a tape running state, current supply to the solenoid 17 is interrupted, and the movable core 17a assumes a free state. The arm 85 and the guide lever 94 then try to rotate in clockwise directions due to forces by the springs 89 and 95, respectively. As a result, the rod 83 is moved in the direction of arrow I in FIG. 8, and the pressing arms 73 and 77 rotate in counterclockwise directions to return to the state shown in FIG. 7, that is, to a standby state. High-speed running of the magnetic tape 4 is performed in this state. In an unloaded state, the base 32 is moved from the position shown in FIG. 7 to the position shown in FIG. 6 by an operation reverse to the above-described operation.

As described above, in positioning the base 32, that is, in positioning the pinch roller 11 during a loading operation, by engaging the upper and lower ends of the shaft 58, serving as the center of the rotation of the pinch arm 59 supporting the pinch roller 11, with the V-groove 15a and the U-groove 15b of the catching member 15, respectively, the shaft 58 is highly accurately positioned at predetermined positions both in the vertical and horizontal directions, and the angle of the shaft 58 is highly accurately defined. Hence, the angle of the pinch arm 59 is also highly accurately defined, and it is possible to highly accurately define inclination of the pinch roller 11. Furthermore, as described above, a reaction force during the pressing operation of the pinch roller 11 operates in a direction to stabilize the catching operation. Thus, since inclination of the pinch roller 11 can be highly accurately defined, and the inclination does not change due to a reaction force during the pressing operation, it is possible to secure stable running of the magnetic tape 4.

The pressing arms 73 and 77 are rotatably pivoted around the shaft 81 separately at their central portions, and their respective ends facing each other are connected by the connecting shaft 82. The pressing arms 73 and 77 rotate by applying a force on a central portion of the connecting shaft 82 between the pressing arms 73 and 77 by the arm 83. The rollers 75 and 79 at end portions of the arms 73 and 77 opposite to the connecting shaft 82 press the cap 61 and the pinch arm 59 at two end portions of the pinch roller 11, and the pinch roller 11 thereby presses the capstan 18.

Figure 2A:
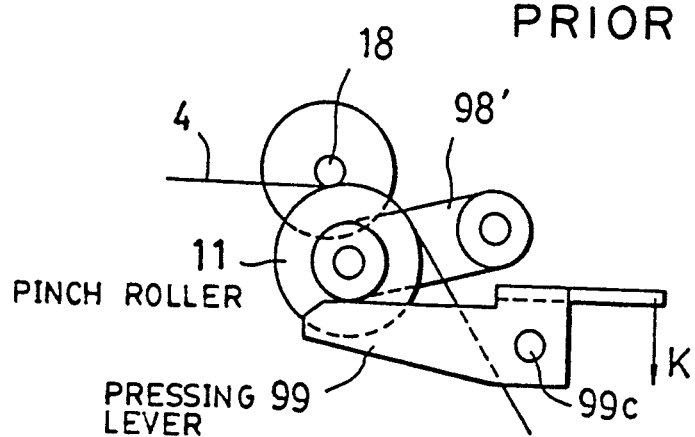
FIGS. 2(A) and 2(B) are a plan view and a side view showing the configuration of a principal part of another conventional pinch roller pressing mechanism, respectively.
Figure 2B:
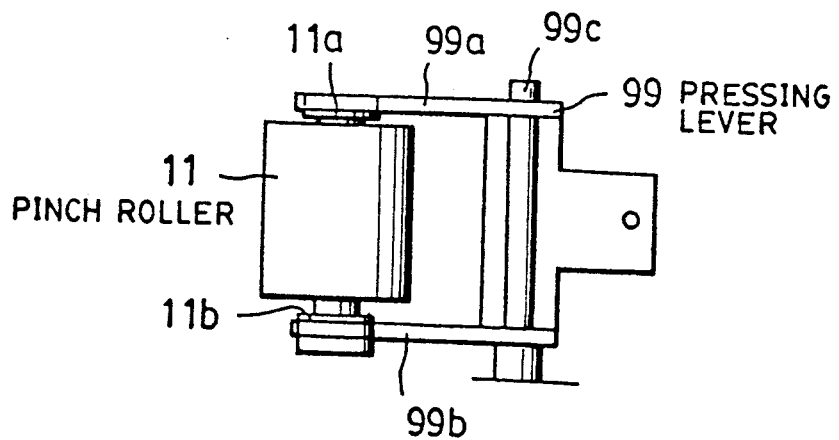

According to this configuration, if the pressing forces of the pressing arms 73 and 77 differ according to the positions of the pressing arms 73 and 77 during the pressing operation, the pressing arms 73 and 77 slightly rotate in directions reverse to each other due to a difference in the reaction forces, and a balance is provided so that the reaction forces become equal. That is, a balance is provided so that the pressing forces of the pressing arms 73 and 77 are equal. Accordingly, two end portions of the pinch roller 11 can be pressed with uniform pressing forces, and hence pressing forces along the direction of the shaft of the pinch roller 11 can be uniform. It is therefore possible to secure stable tape running. Furthermore, according to the present embodiment, since the above-described pressing forces are automatically balanced, position adjustment as in the conventional example shown in FIGS. 2(A) and 2(B) becomes unnecessary.

Such configuration of the pinch roller pressing mechanism can of course be applied not only to a VCR, but also to other magnetic recording and reproducing apparatuses.

As explained above, a video cassette recorder device according to the present invention provides a mechanism comprising a pinch roller for pressing a magnetic tape against a capstan, an arm member for rotatably supporting the pinch roller, a base member for rotatably pivoting the arm member, a positioning member for positioning the base member at a predetermined position, and a moving mechanism for moving the base member and engaging it with the positioning member to position the base member at the predetermined position when the magnetic tape is loaded. The mechanism is configured so that the base member is positioned by engaging two end portions of a shaft for pivoting the arm member with the positioning member during the loading operation. Thus, the present invention has the following excellent effects: When positioning the base member during the loading operation, the shaft for pivoting the arm member can be very accurately positioned at a predetermined position, and its angle can be very accurately defined. The arm member's angle can thereby be very accurately defined, and inclination of the pinch roller can be very accurately defined. Hence, it is possible to secure stable running of the magnetic tape.

A video cassette recorder device according to the present invention also provides a pinch roller pressing mechanism for pressing a pinch roller against a capstan by pressing two end portions of the pinch roller with respective two arms rotatably pivoted facing each other and parallel to each other by rotating the arms, wherein the two arms are pivoted so as to be rotatable separately around their central portions, and respective one ends of the arms facing each other are connected by a connecting shaft. The two arms rotate by applying a force on a central portion of the connecting shaft between the arms, and respective end portions of the arms opposite to the connecting shaft press two end portions of the pinch roller. Thus, the present invention has the excellent effects that pressing forces pressing the two end portions of the pinch roller are automatically balanced, the pressing force of the pinch roller can be uniform along the direction of its shaft without adjustment, and it is possible to secure stable running of a magnetic tape.

The individual components shown in outline in the Drawings are all well-known in the video cassette recorder arts, and their specific construction and operation are not critical to the operation or best mode for carrying out the invention, While the present invention has been described with respect to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A control device for controlling a pinch roller, in a recording or reproducing device, comprising:
   a capstan;
   a pinch roller rotatable about its axis by engaging with said capstan;
   a first member for supporting said pinch roller at one end of said first member, said first member comprising means for permitting rotation of said pinch roller about said axis, and said first member being movable to an engaging position where said pinch roller engages said capstan and to a non-engaging position where said pinch roller does not engage said capstan;
   a supporting member pivotally connected to an other end of said first member;
   a movable second member pivotally connected to said supporting member, so that said first member and said second member are each independently pivotable relative to said supporting member;
   a positioning member for positioning said supporting member and said second member at a predetermined position against said positioning member where said first member is movable to said engaging position; and
   a moving mechanism for moving said second member and said supporting member to said predetermined position against said positioning member;
   wherein said positioning member engages with a plurality of portions of said supporting member to position said supporting member.

2. A control device according to claim 1, further comprising tape loading means for loading the tape-like recording medium onto a recording or reproducing head, and wherein said moving mechanism moves said second member to a position near said capstan in accordance with the loading operation of said tape loading means.

3. A control device according to claim 2, wherein said positioning member engages with said supporting member for connecting said first member and said second member at an upper position and at a lower position thereof to position said supporting member.

4. A control device according to claim 2, wherein said second member includes a tape guide post for guiding the tape-like recording medium.

5. A recording or reproducing device for recording on or reproducing from a tape-like recording medium comprising:
   a capstan;
   a pinch roller rotatable about its axis for pressing said recording medium against said capstan;
   a first member for supporting said pinch roller at one end of said first member, said first member comprising means for permitting rotation of said pinch roller about said axis and said first member being movable to an engaging position where said pinch roller engages said capstan and to a non-engaging position where said pinch roller does not engage said capstan;

a supporting shaft pivotally connected to an other end of said first member;

a movable second member pivotally connected to said supporting shaft so that said first member and said second member are each independently pivotable relative to said supporting shaft;

a positioning member for positioning said supporting shaft and said second member at a predetermined position against said positioning member where said first member is movable to said engaging position; and a moving mechanism for moving said second member and said supporting shaft against said positioning member to position said supporting shaft and said second member at the predetermined position when the tape-like recording medium is loaded;

wherein said second member and said supporting shaft are positioned by engaging a plurality of portions of said supporting shaft with said positioning member when the tape-like recording medium is loaded.

6. A recording or reproducing device according to claim 5, further comprising (i) a rotating head drum around which the tape-like recording medium is wound and which supports a head, and (ii) a tape loading means for winding the tape-like recording medium around said rotating head drum, and said moving mechanism moves said second member to a position near said capstan in accordance with the loading operation of said tape loading means.

7. A recording or reproducing device according to claim 5, wherein said positioning member engages with said supporting shaft for connecting said first member and said second member at an upper position and at a lower position thereof to position said supporting shaft.

8. A recording or reproducing device according to claim 7, wherein said second member includes a tape guide post for guiding the tape-like recording medium adjacent to said pinch roller.

9. A recording medium driving device comprising:
a capstan serving as a driving source for driving a tape-like recording medium;
a pinch roller for placing the recording medium in a driven state by engaging with said capstan;
a shaft;
an actuating member comprising a pair of levers rotatable around said shaft, having respective one lever ends and respective other lever ends at which are formed pressing members for pressing said pinch roller against said capstan at an upper portion and a lower portion thereof;
a connecting member for movably connecting said lever ends to each other, said connecting member having two connecting member ends each being pivotally attached to each of said respective one lever ends so that said levers have a range of independent rotation around said shaft relative to each other; and
a control member for operating said actuating member by engaging with a central portion of said connecting member to urge said connecting member so as to rotate said levers so that said pressing members press said pinch roller against said capstan.

10. A recording medium driving device according to claim 9, further comprising rollers disposed at said pressing members of said actuating member.

11. A recording medium driving device according to claim 10, wherein said pinch roller is mounted so as to be rotatable around a supporting member, and said rollers of said actuating member press said supporting member at portions corresponding to upper and lower portions of said pinch roller.

12. A recording medium driving device according to claim 10, further comprising a rotating head drum around which the tape-like recording medium is wound and which is adapted to support a recording or reproducing head for recording on or reproducing from the recording medium, and tape loading means for winding the tape-like recording medium around said rotating head drum, and wherein said pinch roller moves to a position near said capstan in accordance with the loading operation of said tape loading means.

13. A recording medium driving device according to claim 12, further comprising a plunger for operating said actuating member by driving said control member to press said pinch roller against said capstan.

14. A recording or reproducing device for recording on or reproducing from a tape-like recording medium comprising:
a capstan;
a pinch roller;
a pinch roller supporting member for rotatably supporting said pinch roller, and capable of moving said pinch roller between a position capable of pressing against said capstan and a position separate from said capstan;
a shaft;
an actuating member comprising a pair of levers, disposed parallel to each other and rotatable around said shaft, having respective one lever ends and respective other lever ends at which are formed engaging members engageable with said pinch roller supporting member at upper and lower portions of said pinch roller;
a connecting member for movably connecting said lever ends to each other, said connecting member having two connecting member ends each being pivotally attached to each of said respective one lever ends so that said levers have a range of independent rotation around said shaft relative to each other; and
a control member for operating said actuating member by engaging with a central portion of said connecting member to urge said connecting member so as to rotate said levers so that said engaging members engage said pinch roller supporting member to press said pinch roller against said capstan.

15. A recording or reproducing device according to claim 14, further comprising (i) a rotating head drum around which the tape-like recording medium is wound and which supports said head, and (ii) a tape loading means for winding the tape-like recording medium around said rotating head drum, and said pinch roller supporting member moves to a position near said capstan in accordance with the loading operation of said tape loading means.

16. A recording or reproducing device according to claim 15, further comprising roller members disposed at said engaging members of said actuating member, and wherein said roller members press upper and lower portions of said pinch roller supporting member.

17. A recording or reproducing device according to claim 15, further comprising a plunger for operating said actuating member and said pinch roller supporting member by driving said acuating member to press said pinch roller against said capstan.

* * * * *

UNITED STATES PATENT AND TRADEMARK OFFICE
CERTIFICATE OF CORRECTION

PATENT NO. : 5,315,459
DATED : May 24, 1994
INVENTOR(S) : Takashi KIMURA

It is certified that error appears in the above-indentified patent and that said Letters Patent is hereby corrected as shown below:

COLUMN 1:
Line 68, "rotable" should read --rotatable--.

COLUMN 7:
Line 16, "catched." should read --secured.--

COLUMN 12:
Line 5, "invention," should read --invention.--; and
Line 6, "be" should be deleted.

Signed and Sealed this

Thirteenth Day of December, 1994

Attest:

BRUCE LEHMAN

Attesting Officer    Commissioner of Patents and Trademarks